United States Patent
Wang

Patent Number: 5,917,697
Date of Patent: Jun. 29, 1999

[54] CPU COOLING ARRANGEMENT

[76] Inventor: Daniel Wang, 12F, No. 15, Keelung Rd., Sec. 2, Taipei, Taiwan

[21] Appl. No.: 09/014,046

[22] Filed: Jan. 27, 1998

[51] Int. Cl.$^6$ .................................................. H05K 7/20
[52] U.S. Cl. ........................ 361/695; 361/697; 257/722; 174/16.1; 174/16.3; 165/80.3
[58] Field of Search ................................. 361/687, 688, 361/689, 690–699, 704; 165/80.3, 104.33; 174/15.1, 16.1; 257/706, 717–722

[56] References Cited

U.S. PATENT DOCUMENTS

| | | | |
|---|---|---|---|
| 5,107,398 | 4/1992 | Bailey | 165/80.3 |
| 5,497,825 | 3/1996 | Yu | 361/695 |
| 5,566,377 | 10/1996 | Lee | 361/695 |
| 5,583,316 | 12/1996 | Kitahara et al. | 174/16.3 |
| 5,630,469 | 5/1997 | Butterbaugh et al. | 165/80.3 |

*Primary Examiner*—Leo P. Picard
*Assistant Examiner*—Boris L. Chervinsky
*Attorney, Agent, or Firm*—Rosenberg, Klein & Bilker

[57] ABSTRACT

CPU cooling arrangement including a hood covered on a fan above a heat sink at the top of a CPU inside a computer mainframe, the hood having at least one air inlet, and at least one air pipe for guiding outside cooling air to the heat sink, each air pipe having one end connected to one air inlet on the hood and an opposite end connected to the outside of the computer mainframe.

4 Claims, 5 Drawing Sheets

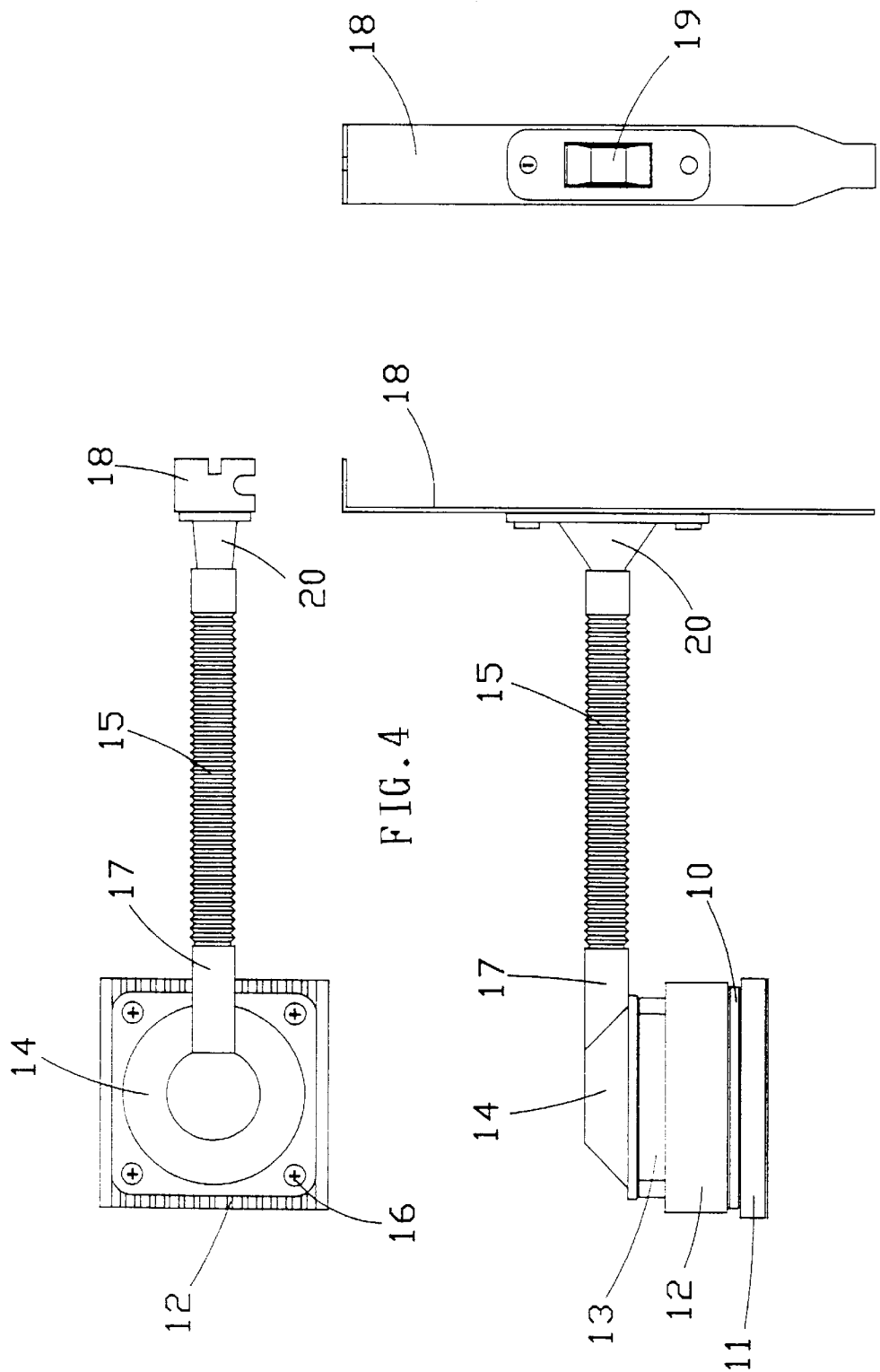

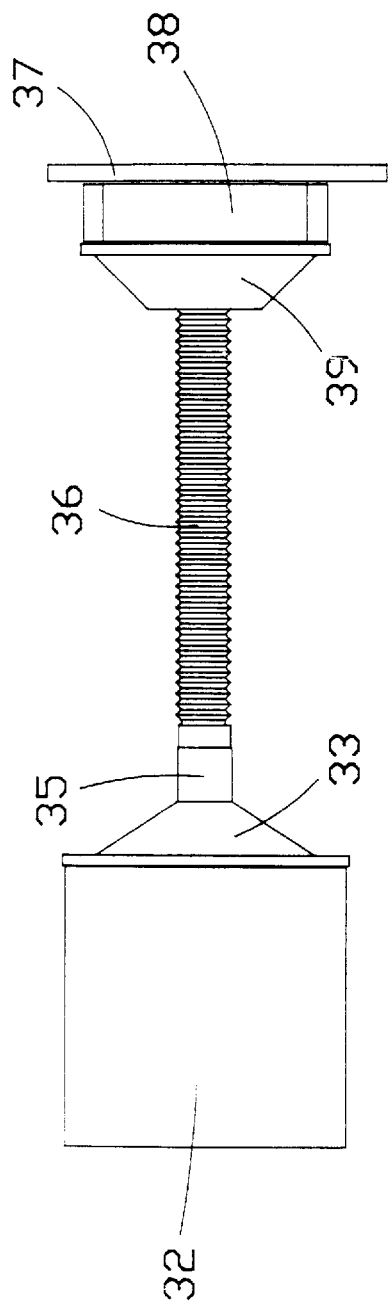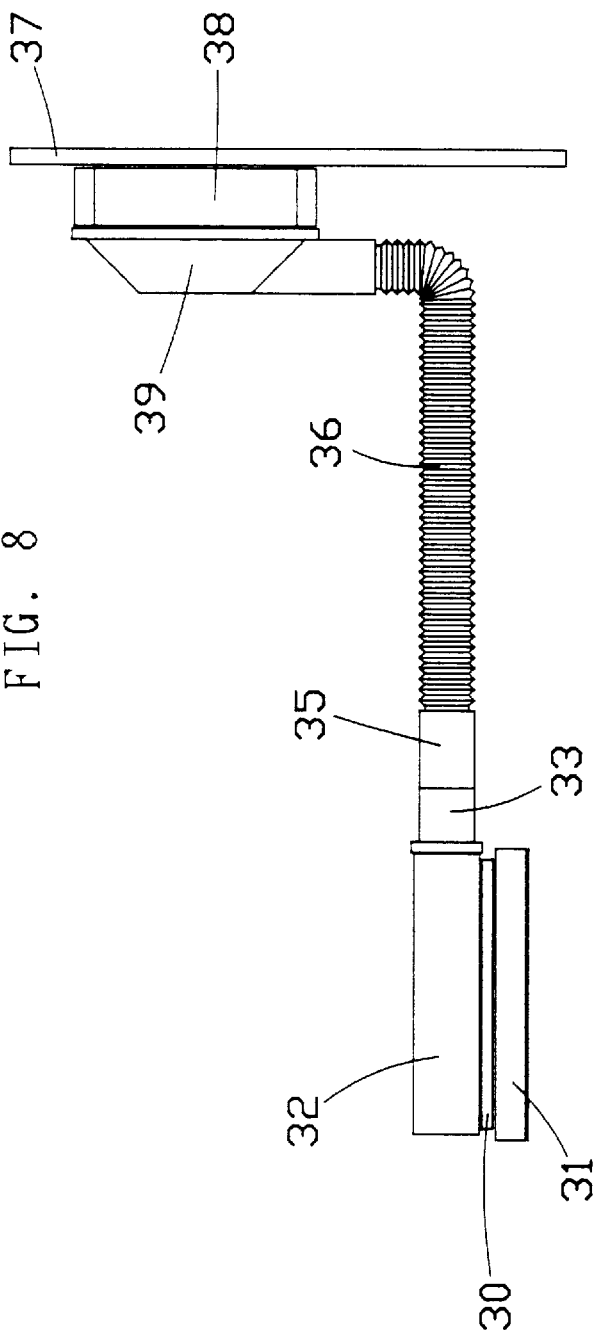
FIG. 8
FIG. 7

CPU COOLING ARRANGEMENT

BACKGROUND OF THE INVENTION

The present invention relates to a CPU cooling arrangement for carrying heat away from a CPU in a computer, and more particularly to such a CPU cooling arrangement which achieves a high heat dissipation effect, and saves much energy.

When the CPU of a computer is operated, heat must be quickly carried away so that the CPU can keep functioning well. According to conventional methods, a fan is mounted on a heat sink above the CPU. When the fan is started, currents of air are induced to flow through the heat sink, causing heat to be dissipated into the air. This arrangement is less effective because most air stays inside the computer. Further, this arrangement consumes much energy because the fan is continuously operated during the operation of the CPU.

SUMMARY OF THE INVENTION

According to one embodiment of the present invention, the CPU cooling arrangement comprises a hood covered on a fan above a heat sink at the top of a CPU inside a computer mainframe, the hood having at least one air inlet, and at least one air pipe for guiding outside cooling air to the heat sink, each air pipe having one end connected to one air inlet on the hood and an opposite end connected to the outside of the computer mainframe. According to a second embodiment of the present invention, the CPU cooling arrangement comprises a hood covered on a heat sink above a CPU inside a computer mainframe, the hood having an air inlet, a fan mounted on a frame board of the computer mainframe and controlled to draw outside cooling air into the inside of the computer mainframe, and an air pipe connected between the fan and the air inlet on the hood for guiding outside cooling air to the heat sink.

BRIEF DESCRIPTION OF THE DRAWINGS

FIG. 3 is a front view of the CPU cooling arrangement shown in FIG. 1.

FIG. 4 is a top view of the CPU cooling arrangement shown in FIG. 1.

FIG. 5 is a side view of the CPU cooling arrangement shown in FIG. 1.

FIG. 7 is a front view of the CPU cooling arrangement according to the second embodiment of the present invention.

FIG. 8 is a top view of the CPU cooling arrangement according to the second embodiment of the present invention.

DETAILED DESCRIPTION OF THE PREFERRED EMBODIMENT

Figure 1:
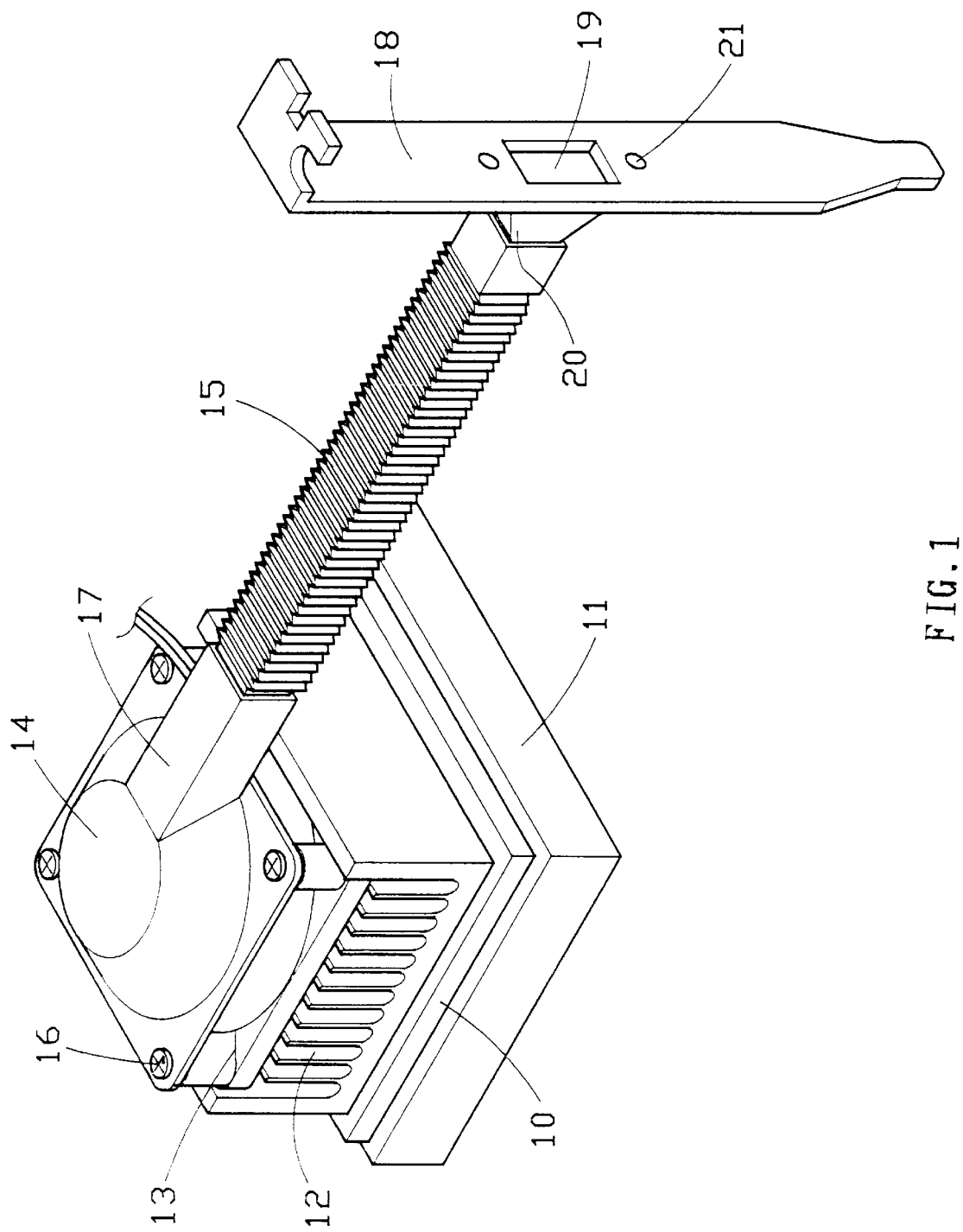
FIG. 1 is a perspective view of a CPU cooling arrangement according to the first embodiment of the present invention.
Figure 2:
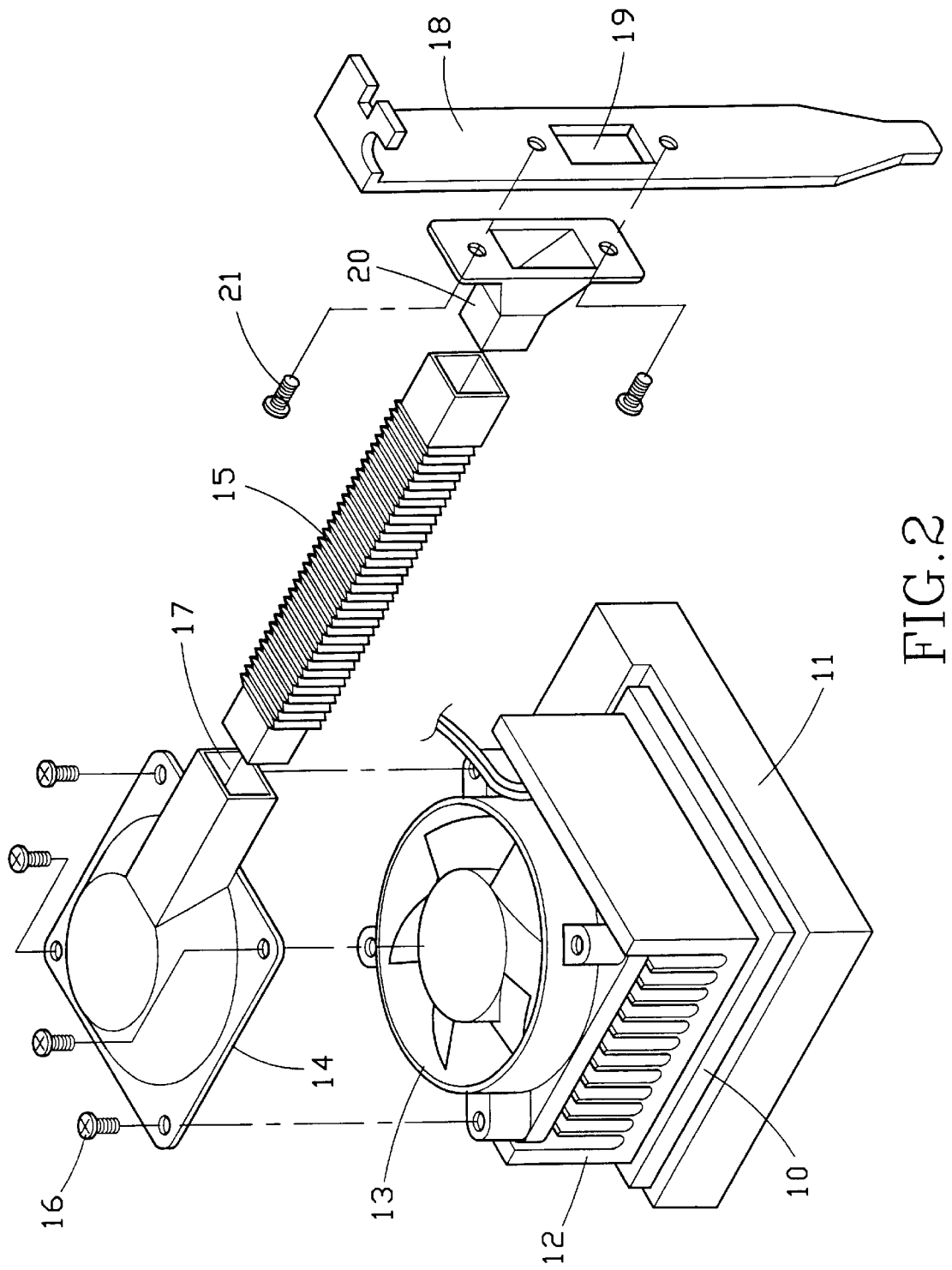
FIG. 2 is an exploded view of the CPU cooling arrangement shown in FIG. 1.
Figure 6:
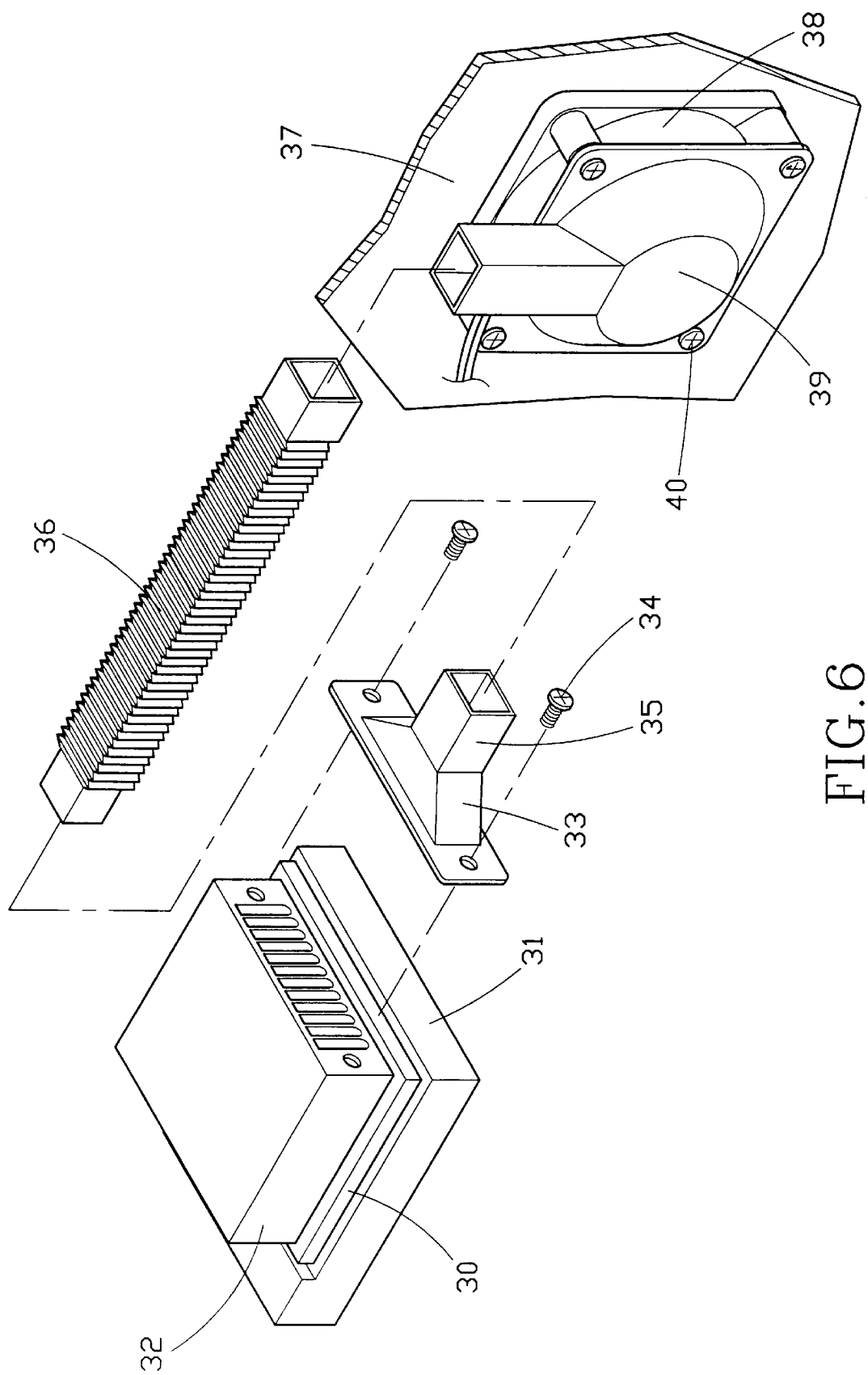
FIG. 6 is an exploded view of a CPU cooling arrangement according to a second embodiment of the present invention.

Referring to Figures from 1 to 5, a CPU 10 is mounted on a CPU mount 11 on a computer mother board (not shown). A heat sink 12 is secured to the CPU 10 at the top. A fan 13 is mounted on the heat sink 12, and controlled to draw currents of air through the heat sink 12, permitting heat to be quickly carried away from the CPU 10 and the heat sink 12. A hood 14 is covered on the top open side of the fan 13, and secured to the shell of the fan 13 by for example screws 16. The hood 14 has an air inlet 17 through which outside cooling air is drawn to the heat sink 12. An air pipe 15 is a bellows pipe connected with its one end to the air inlet 17 on the hood 14. The opposite end of the air pipe 15 is connected to a fitting 20, which is fastened to a frame board 18 at the rear side of the computer mainframe. The frame board 18 has an air hole 19 in communication with the air pipe 15 through the fitting 20.

When in use, the fan 13 is operated to draw outside cooling air into the air hole 19, the fitting 20 and the air pipe 15, enabling intake currents of air to flow through the heat sink 12 and to carry heat away from the heat sink 12 and the CPU 10.

Figures from 6 to 8 show an alternate form of the present invention which comprises a hood 33 fastened to one side of a heat sink 32 by screws 34. The heat sink 32 is mounted on a CPU 30 above a CPU mount 31. The hood 33 has an air inlet 35 connected to a fan 38 through an air pipe 36. The air pipe 36 is a bellows pipe having one end connected to the air inlet 35 on the hood 33, and an opposite end connected to a hood 39, which is covered on the fan 38 and secured to the shell 37 of the computer mainframe by screws 40.

When in use, the fan 39 is operated to draw outside cooling air into the air pipe 36, enabling intake currents of air to pass through the heat sink 32 and to carry heat away from the heat sink 32 and the CPU 30.

It is to be understood that the drawings are designed for purposes of illustration only, and are not intended as a definition of the limits and scope of the invention disclosed.

What the invention claimed is:

1. A CPU cooling arrangement comprising:

a hood, said hood having at least one air inlet;

an air pipe, said air having one end connected to the at least one air inlet of said hood and an opposite end fixedly fastened to the outside of a computer mainframe in which the CPU cooling arrangement is installed;

wherein said hood is coupled to a fan on a heat sink above CPU inside the computer mainframe to guide outside air toward the heat sink upon operation of fan.

2. A cooling arrangement for a CPU in a computer, comprising:

a heat sink mounted on the CPU;

a fan mounted on said heat sink, said fan having an outlet disposed adjacent said heat sink;

a hood coupled to said fan in overlaying relationship with an inlet of said fan, said hood having an air inlet through which air is drawn by said fan;

a frame board mounted to a rear side of the computer's mainframe, said frame board having a through opening formed therein for passage of ambient air external to the computer therethrough; and an air pipe coupled in fluid communication between said air inlet of said hood and said through opening of said frame board to transport the external ambient air to said inlet of said fan, said fan discharging the external ambient air to said heat sink.

3. The cooling arrangement as recited in claim 2 where said air pipe is a bellows pipe.

4. The cooling arrangement as recited in claim 2 where said air pipe is fluidly coupled to said opening of said frame board through a fitting secured to said frame board in overlaying relationship with said opening.

* * * * *